US010690697B1

(12) United States Patent
Xiao et al.

(10) Patent No.: US 10,690,697 B1
(45) Date of Patent: Jun. 23, 2020

(54) METROLOGY TECHNIQUE THAT PROVIDES TRUE FLATTENING

(71) Applicant: Seagate Technology LLC, Cupertino, CA (US)

(72) Inventors: Zhiyong Xiao, Edina, MN (US); Gary Kunkel, Minneapolis, MN (US); Dan Dinh, Savage, MN (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 0 days.

(21) Appl. No.: 16/171,735

(22) Filed: Oct. 26, 2018

(51) Int. Cl.
*G01Q 30/04* (2010.01)
*G01Q 60/24* (2010.01)
*G01Q 80/00* (2010.01)
*G06T 7/00* (2017.01)

(52) U.S. Cl.
CPC ............. *G01Q 30/04* (2013.01); *G01Q 60/24* (2013.01); *G01Q 80/00* (2013.01); *G06T 7/001* (2013.01); *G06T 2207/10061* (2013.01)

(58) Field of Classification Search
None
See application file for complete search history.

(56) References Cited

U.S. PATENT DOCUMENTS

| | | | |
|---|---|---|---|
| 5,898,106 A | 4/1999 | Babcock et al. | |
| 6,804,085 B1 * | 10/2004 | Azarian | G11B 5/3106 360/135 |
| 7,406,860 B2 | 8/2008 | Zhou et al. | |
| 7,552,524 B2 | 6/2009 | Ma et al. | |
| 8,296,860 B2 * | 10/2012 | Liu | G01Q 30/06 250/306 |
| 8,371,155 B2 | 2/2013 | Zhou et al. | |
| 8,490,211 B1 * | 7/2013 | Leary | G01Q 60/56 850/46 |
| 9,150,415 B2 | 10/2015 | Zhou et al. | |
| 2007/0098285 A1 * | 5/2007 | Yahata | H04N 19/59 382/239 |
| 2009/0077697 A1 * | 3/2009 | Su | G01Q 10/06 850/52 |
| 2010/0235956 A1 * | 9/2010 | Liu | G01Q 30/06 850/33 |

(Continued)

Primary Examiner — Michael J Logie
(74) Attorney, Agent, or Firm — Westman, Champlin & Koehler, P.A.

(57) ABSTRACT

An apparatus and method for topographically characterizing a workpiece. The method includes scanning a first surface of a workpiece with a scanning probe at a first resolution to derive a first topographical image, and performing a refining operation on the first topographical image to obtain a true first topographical image. The method also includes scanning, with the scanning probe, a surface of interest of the workpiece, which is a sub-portion of the first surface, at a second resolution that is higher than the first resolution to derive a second topographical image. The second topographical image is scaled down to the first resolution. The method further includes performing a pattern recognition operation to substantially match the scaled-down second topographical image to a corresponding sub-portion of the true first topographical image. The matched sub-portion of the true first topographical image is employed to refine the second topographical image.

16 Claims, 10 Drawing Sheets

(56) References Cited

U.S. PATENT DOCUMENTS

| | | | |
|---|---|---|---|
| 2011/0138505 A1* | 6/2011 | Zhou | B82Y 35/00 |
| | | | 850/1 |
| 2012/0042422 A1* | 2/2012 | Zhou | B82Y 35/00 |
| | | | 850/1 |
| 2012/0058460 A1* | 3/2012 | Coursey | B01L 3/502784 |
| | | | 435/3 |
| 2013/0081159 A1 | 3/2013 | Liu et al. | |
| 2015/0124355 A1* | 5/2015 | Ellison | G11B 5/6058 |
| | | | 360/290 |
| 2015/0125065 A1* | 5/2015 | Lee | G06T 7/001 |
| | | | 382/149 |
| 2015/0160260 A1* | 6/2015 | Gabi | G01Q 30/04 |
| | | | 850/10 |
| 2016/0025772 A1 | 1/2016 | Zhou et al. | |
| 2019/0049486 A1* | 2/2019 | Godec-Schonbacher | |
| | | | G01Q 30/025 |

* cited by examiner

METROLOGY TECHNIQUE THAT PROVIDES TRUE FLATTENING

SUMMARY

In one embodiment, a method is provided. The method includes scanning a first surface of a workpiece with a scanning probe at a first resolution to derive a first topographical image, and performing a refining operation on the first topographical image to obtain a true first topographical image. The method also includes scanning, with the scanning probe, a surface of interest of the workpiece, which is a sub-portion of the first surface, at a second resolution that is higher than the first resolution to derive a second topographical image. The second topographical image is scaled down to the first resolution. The method further includes performing a pattern recognition operation to substantially match the scaled-down second topographical image to a corresponding sub-portion of the true first topographical image. The matched sub-portion of the true first topographical image is employed to refine the second topographical image at the second higher resolution.

In another embodiment, an apparatus is provided. The apparatus includes a scanning probe tool that scans a first surface of a workpiece at a first resolution to derive a first topographical image, and performs a refining operation on the first topographical image to obtain a true first topographical image. The scanning probe tool also scans a surface of interest of the workpiece, which is a sub-portion of the first surface, at a second resolution that is higher than the first resolution to derive a second topographical image. Additionally, the scanning probe tool scales down the second topographical image to the first resolution, and performs a pattern recognition operation to substantially match the scaled-down second topographical image to a corresponding sub-portion of the true first topographical image. Further, the scanning probe tool employs the matched sub-portion of the true first topographical image to refine the second topographical image at the second higher resolution.

In yet another embodiment, a method is provided. The method includes performing a one-directional scan of a first surface of a workpiece with a scanning probe at a first resolution to derive a first topographical image, and scanning, with the scanning probe, a reference surface, which is a part of a substantially flat portion of the workpiece, to derive a reference topographical image. The method also includes utilizing the reference topographical image to perform a refining operation on the first topographical image to obtain a true first topographical image. The method further includes scanning, with the scanning probe, a surface of interest of the workpiece, which is a sub-portion of the first surface, at a second resolution that is higher than the first resolution to derive a second topographical image, and employing the true first topographical image to refine the second topographical image.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure generally relate to metrology techniques (e.g., scanning probe microscopy such as atomic force microscopy, scanning electron microscopy, etc.) that are useful for measuring and imaging surface features of structures having dimensions in, for example, the nanometer and micrometer range. The small dimensions of the scanned structure, the relative sizes and shapes of the scanning probe tip and the scanned feature, and environmental conditions such as vibration, air flow etc., may result in missed details or the introduction of curvature or artifacts into the resulting image. Embodiments of the disclosure address one or more such problems. Prior to providing a description of the detailed embodiments, a description of a scanning probe system with which embodiments of the disclosure may be implemented is provided below.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Figure 1:
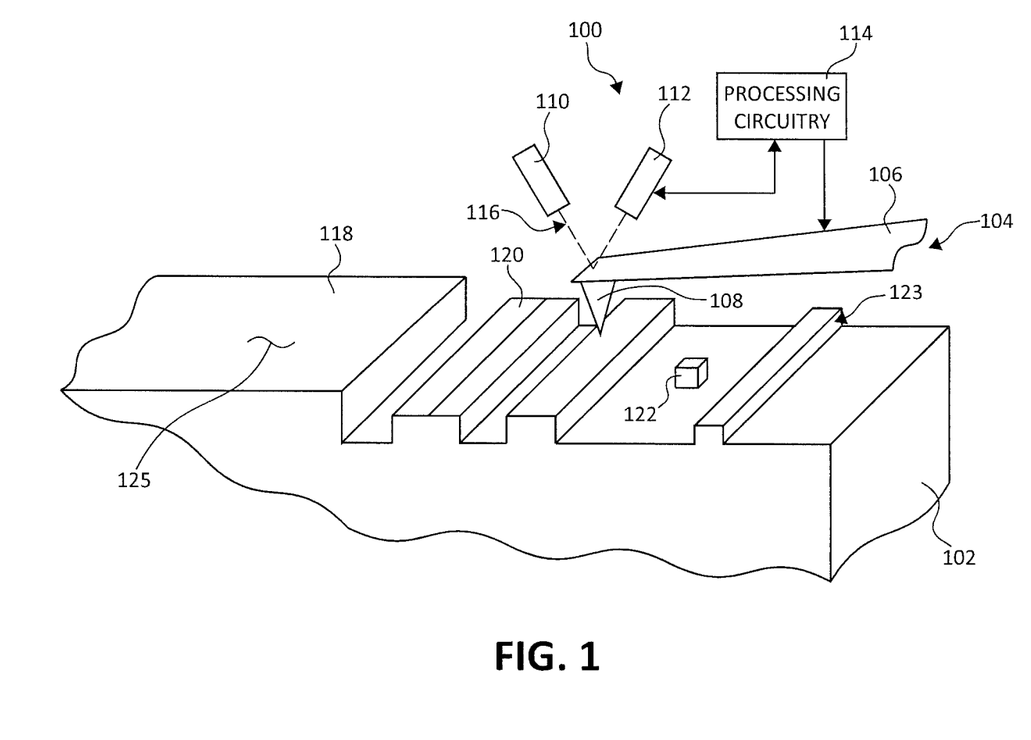
FIG. 1 is a diagrammatic illustration of an atomic force microscope tool positioned over a surface of a structure.

FIG. 1 is a perspective view an atomic force microscope (AFM) tool 100, which is one example of a scanning probe microscope tool, positioned over a surface of structure 102 (sometimes referred to herein as a "workpiece"). AFM tool 100 includes probe 104 having cantilever portion 106 and tip portion 108. Atomic force microscope tool 100 also includes light source 110, position sensitive detector 112, and processing circuitry 114. Light source 110 emits a beam 116 that is reflected by cantilever 106 and received by position sensitive detector 112. Processing circuitry 114 receives signals from position sensitive detector 112 and provides signals to control movement of probe 104 relative to structure 102.

Structure 102 is the pole tip region of a magnetic recording system, including slider 118 carrying reader structure 120, writer structure 122 and a contact pad 123. The scanning probe microscopy (e.g., AFM) techniques described herein are useful for measuring and imaging feature characteristics of structure 102. It should be noted that structure 102 is shown merely for purposes of illustration, and the AFM techniques described herein are also useful for measuring and imaging nanometer and micrometer scale surface features of other structures.

Atomic force microscope tool 100 measures physical characteristics or properties of structure 102, such as feature dimensions and surface finish. Probe tip 108 is positioned in very close proximity (e.g., within picometers) to the surface of structure 102 to allow measurements of structure 102 over a small area. Probe tip 108 is moved relative to structure 102 using extremely precise positioning. For example, processing circuitry 114 may control motion of probe 104 such that probe tip 108 moves along the surface of stationary structure 102. Alternatively, processing circuitry 114 may control a device such as a tube scanner to move structure 102 while probe 104 remains stationary. As probe tip 108 moves over the surface of structure 102, features on the surface of structure 102 cause cantilever 106 to bend in response to the force between probe tip 108 and structure 102.

Position sensitive detector 112 measures the amount of deflection in cantilever 106, which may be used to generate an image representation of structure 102. In particular, light source 110 (e.g., a laser) reflects light beam 116 off of cantilever 106 to position sensitive detector 112. Position sensitive detector 112 may include two side-by-side photodiodes such that the difference between the signals generated by the photodiodes indicates the position of light beam 116 on position sensitive detector 112, and thus the angular deflection of cantilever 106. Because the distance between cantilever 106 and position sensitive detector 112 is generally thousands of times the length of cantilever 106, the motions of probe tip 108 are greatly magnified.

In some examples, such as head media spacing (HMS) modeling for a data storage head, a trailing edge (TE) topography height (e.g., a topography of write pole 122 relative to contact pad 123) can be measured using a portion of a bearing surface (e.g., an air bearing surface (ABS)) as a reference. In FIG. 1, upward-facing surface 125 of the workpiece 122 is the ABS. Accurately measuring slider TE topography is important for HMS prediction, process control, modeling validation, and failure analysis. To help provide substantially accurate topography measurements, AFM tool 100 is configured to implement an advanced scanning microscopy technique which can correct errors caused by scanning-probe induced curvature or bow, system drift, etc.

Figure 2A:
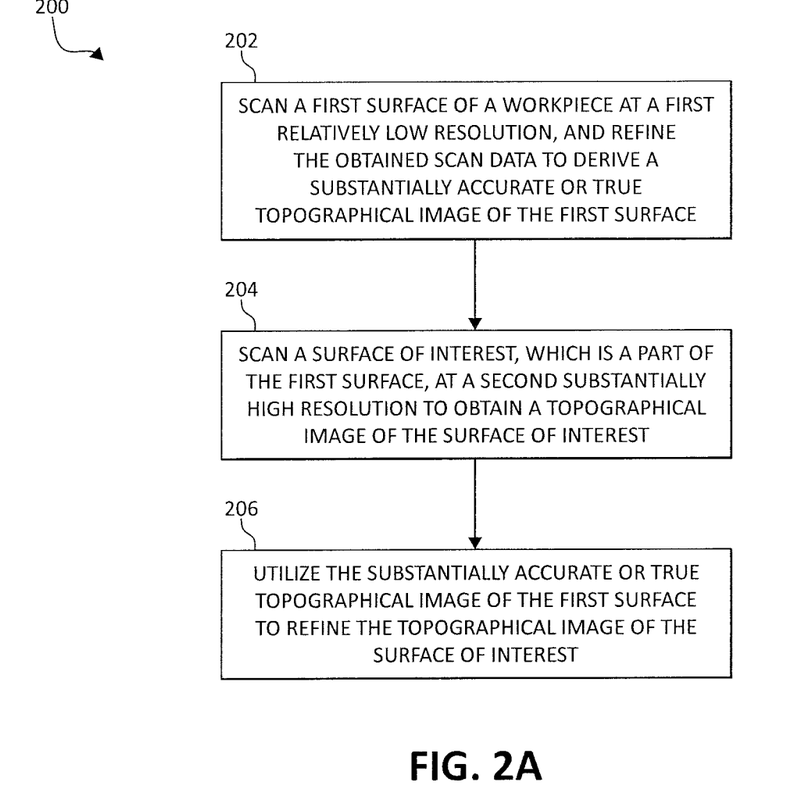
FIG. 2A illustrates a flow diagram of a method embodiment.
Figure 2B:
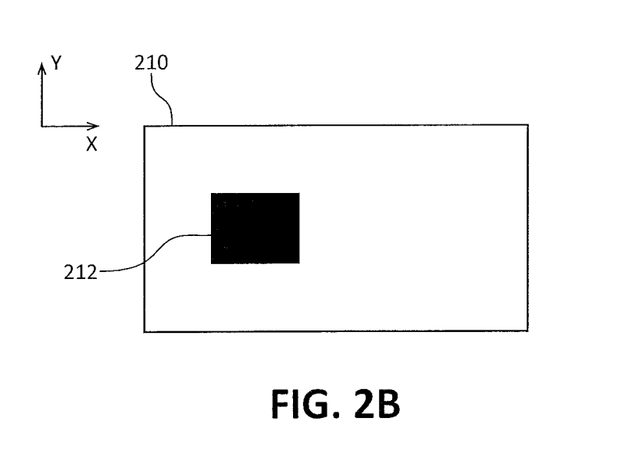
FIG. 2B illustrates a simplified block diagram showing surfaces scanned during the performance of the method embodiment of FIG. 2A.

FIGS. 2A and 2B together illustrate a general embodiment of the disclosure that may be implemented by AFM tool 100 of FIG. 1. Specifically, FIG. 2A illustrates a flow diagram 200 of the general embodiment, and FIG. 2B illustrates a simplified block diagram showing surfaces that are scanned in order to obtain a true topographical image of a surface of interest in accordance with the general embodiment. Referring to FIG. 2A, at block 202, a scanning operation is carried out on a first surface of a workpiece (e.g., surface 210 of FIG. 2B, which may be a surface of workpiece 102 of FIG. 1) at a first relatively low resolution, and the obtained scan data is refined to derive a substantially accurate or true topographical image of the first surface. Refining of a relatively low resolution topographical image is described further below. At block 204 of FIG. 2A, a scanning operation is performed on a surface of interest (e.g., surface 212 of FIG. 2B that is a part of first surface 210 of FIG. 2B) at a second substantially high resolution to obtain a topographical image of the surface of interest. Then, at block 206, the substantially accurate or true topographical image of the first surface is utilized to refine the topographical image of the surface of interest. Details regarding refining of a relatively small substantially high topographical resolution image are provided further below. It should be noted that the scanning operations described above in connection with FIGS. 2A and 2B may be carried out in either an x-direction or in a y-direction or in both the x-direction and the y-direction.

In one embodiment, the surface of interest is a sub-portion of a bearing surface (e.g., a sub-portion of upward-facing surface 125 of FIG. 1) of a slider. In this embodiment, the surface of interest includes a bearing surface portion of a write pole (e.g., 122 of FIG. 1) of the slider and a bearing surface portion of a contact pad (e.g., 123 of FIG. 1) of the slider, and a goal is to obtain a true topography of the bearing surface portion of the write pole relative to a true topography of the bearing surface portion of the contact pad of the slider. This goal may be accomplished by using an image-refining technique described below in connection with FIGS. 3A-3O.

Figure 3A:
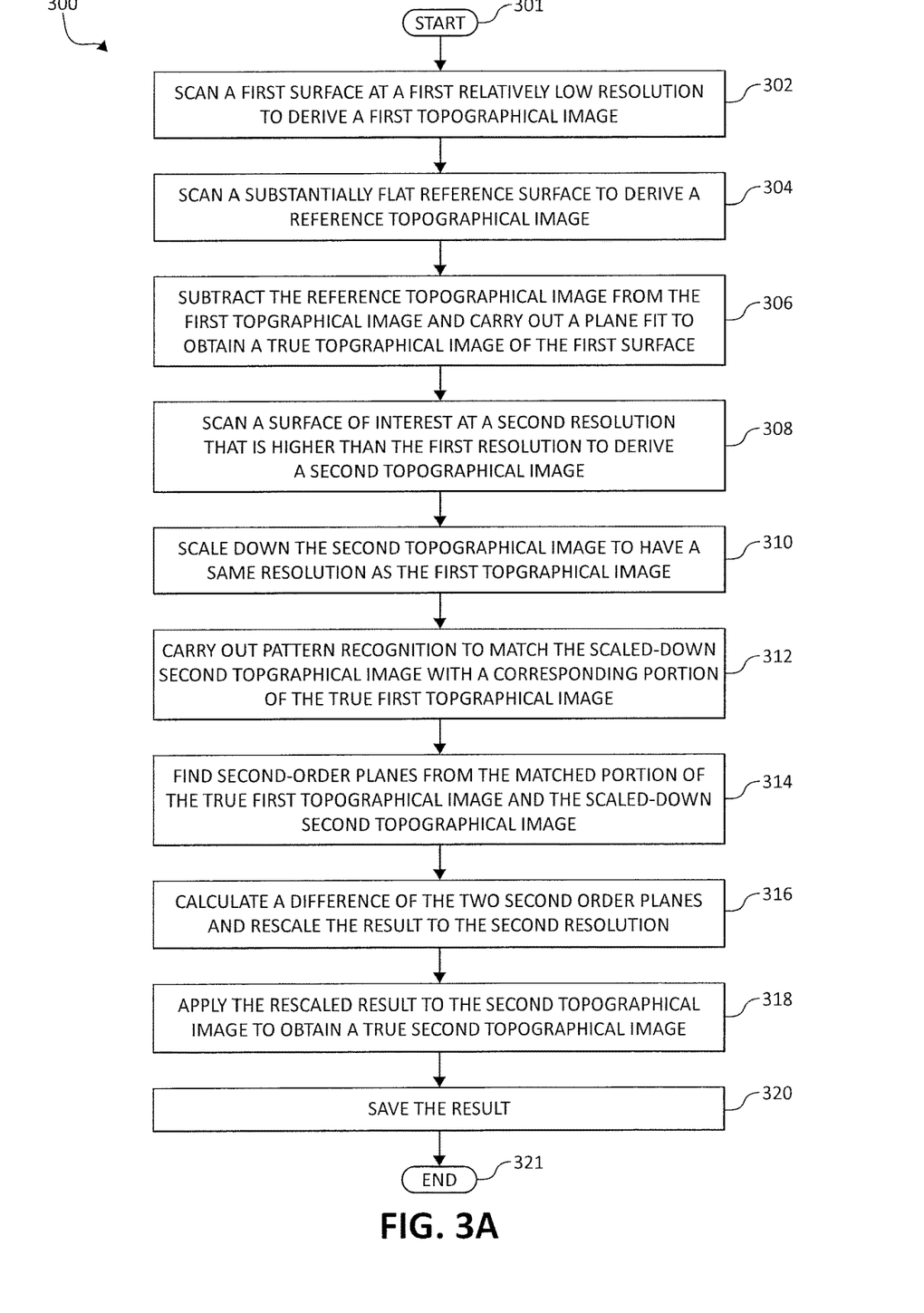
FIG. 3A illustrates a flow diagram of another method embodiment.
Figure 3B:
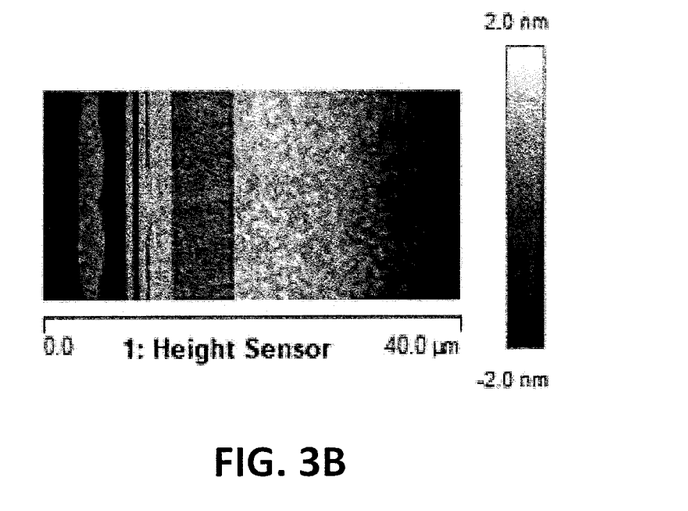
FIG. 3B is a first image generated at a stage of the method of FIG. 3A.
Figure 3C:
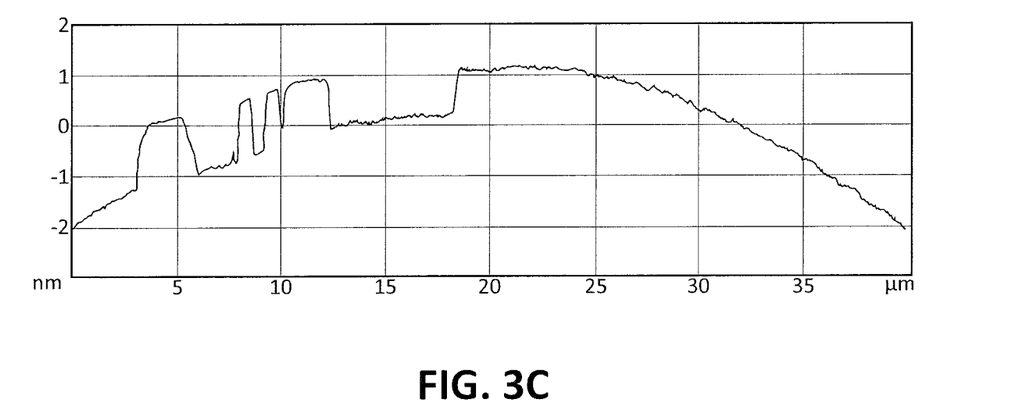
FIG. 3C illustrates a first graph illustrating a profile of the image of FIG. 3B.
Figure 3D:
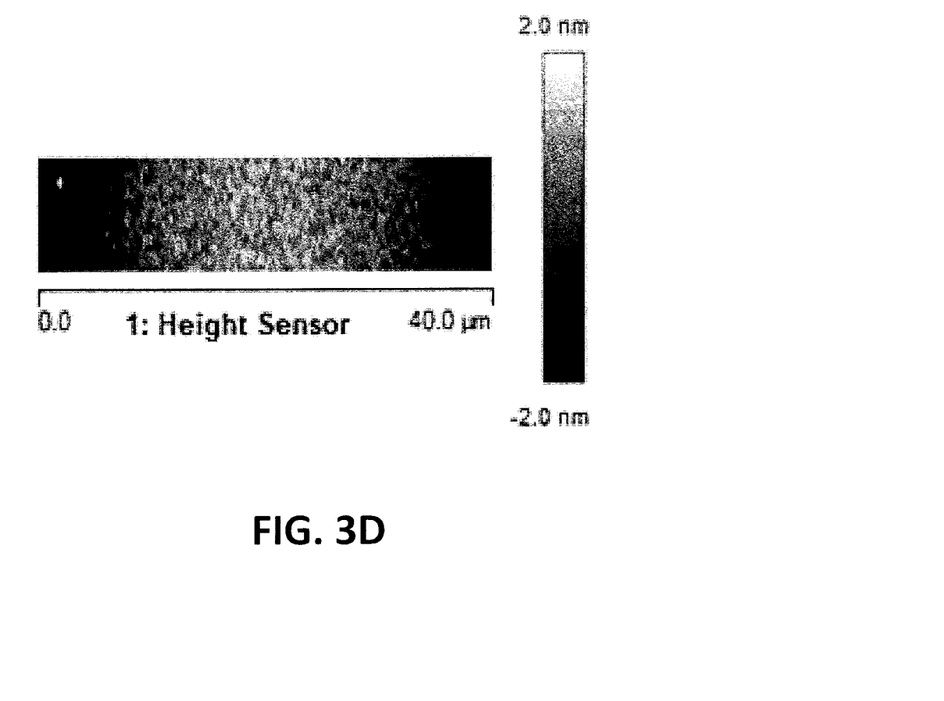
FIG. 3D is a second image generated at a stage of the method of FIG. 3A.
Figure 3E:
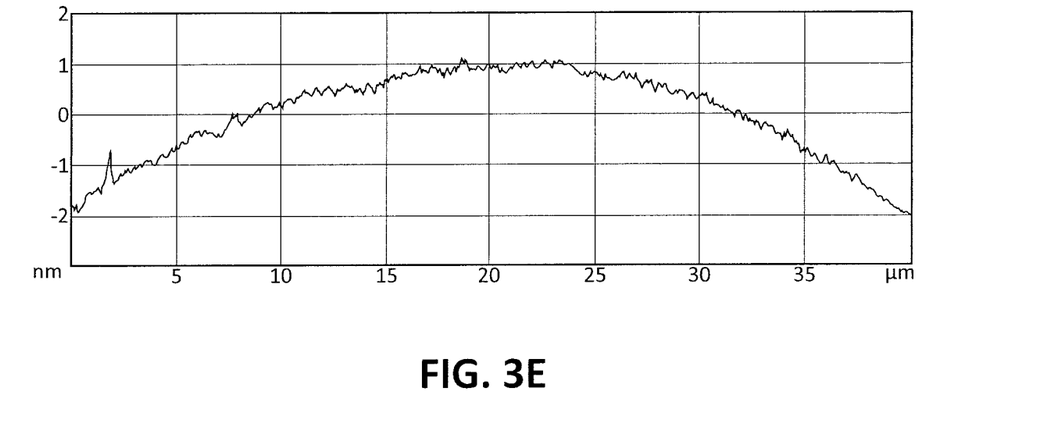
FIG. 3E illustrates a second graph illustrating a profile of the image of FIG. 3D.

FIG. 3A illustrates a flow diagram 300 of a true flattening method in accordance with one embodiment. FIGS. 3B, 3D, 3F, 3H, 3I, 3J and 3O illustrate images generated at different stages of the method of FIG. 3A, and FIGS. 3C, 3E, 3G, 3K, 3L, 3M and 3N illustrate graphs of data associated with stages of the method of FIG. 3A. The method begins at 301. At block 302, a scan (e.g., a one-directional scan) of a first surface of a workpiece is performed with a scanning probe (e.g., an AFM) at a first relatively low resolution to derive a first topographical image. The relatively low resolution of the first surface scan may be about 12 to about 25 pixels per micrometer (μm). The image obtained by this scan is shown in FIG. 3B and is represent by $f_0(x,y)$. In the example of FIG. 3B, the image is a 40 μm×20 μm portion of the bearing surface that includes the contact pad of the slider. The image of FIG. 3B may include scanning probe-induced artifacts or curvature, etc. FIG. 3C, which is a graph that illustrates a profile of the image of FIG. 3B, shows a bow or curvature induced by the scanning probe. The scanning probe-induced curvature or bow may be removed by utilizing a reference surface scan in a manner described below.

Referring back to FIG. 3A, at block 304, a reference surface is scanned with the scanning probe (e.g., an AFM). The reference surface may be a substantially flat portion of the workpiece (e.g., a substantially flat portion of bearing surface 125 of FIG. 1), to derive a reference topographical image represented by $f_{ref}(x,y)$ and shown in FIG. 3D. Since the same scanning probe used to scan the first surface is also utilized to scan the reference surface, a substantially similar scanning probe-induced curvature may be present in the image of FIG. 3D. That curvature in the image of FIG. 3D is shown in the graph illustrated in FIG. 3E, which is a profile of the image of FIG. 3D.

Referring back to FIG. 3A, at block 306, the topographical image of the reference surface is utilized to perform a refining operation on the first topographical image (shown in FIG. 3B). The refining operation first includes removing the scanning-probe induced curvature by applying an subtraction algorithm to the image $f_0$ as follows:

$$f_{nsa}(x,y)=f_0(x,y)-f_{ref}(x,y) \qquad \text{Equation 1}$$

where $f_{nsa}$ is a partially refined first topographical image, which does not include the scanning probe-induced artifact (e.g., the curvature) but may still include a surface tilt. In order to address the surface tilt in the partially refined first topographical image, a plane fitting function is first applied to a true flat area of the slider (e.g., a truly flat portion of bearing surface 125 of FIG. 1) in order to obtain a first order flat plane, which is expressed as follow:

$$f_1(x,y)=a_1x+b_1y+c_1 \qquad \text{Equation 2}$$

where a1, b1, c are fitting parameters.

The true first topographical image ($f_{LargeTopo}(x,y)$) is then obtained with heights of the different parts of the image being relative to the true flat area as follows:

$$f_{LargeTopo}(x,y)=f_{nsa}(x,y)-f_1(x,y) \qquad \text{Equation 3}$$

Figure 3F:
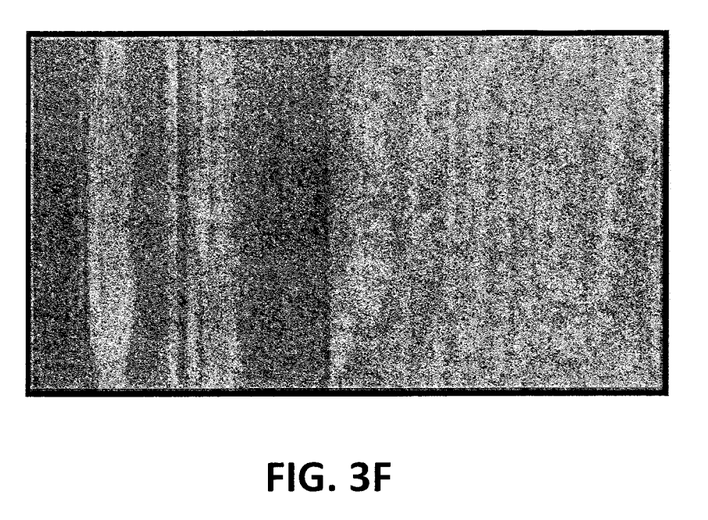
FIG. 3F is a third image generated at a stage of the method of FIG. 3A.
Figure 3G:
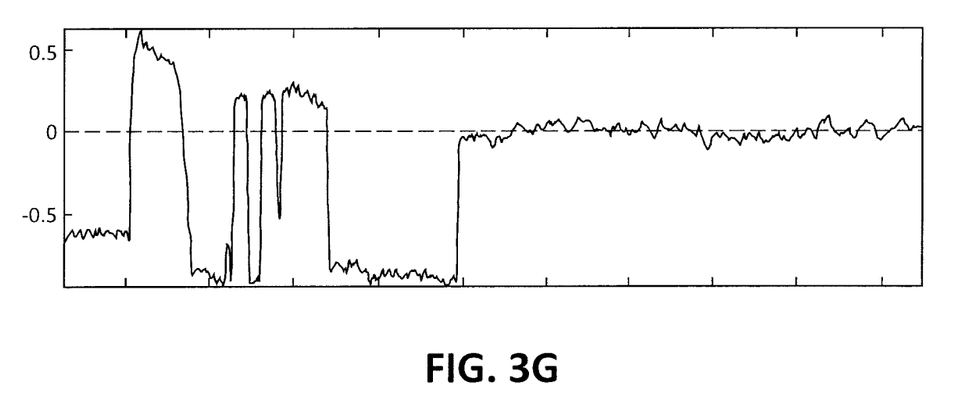
FIG. 3G illustrates a third graph illustrating a profile of the image of FIG. 3F.

An example of the true first topographical image is shown in FIG. 3F, which illustrates the refined image of the 40 μm×20 μm portion of the bearing surface that includes the surface of interest. FIG. 3G is a graph that illustrates a profile of the image of FIG. 3F. The profile shown in FIG. 3G includes the true surface feature profile without the curvature and tilt.

Figure 3H:
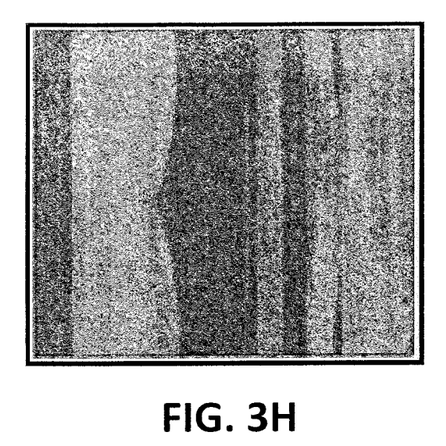
FIGS. 3H, 3I and 3J are fourth, fifth and sixth images, respectively, generated at different stages of the method of FIG. 3A.
Figure 3I:
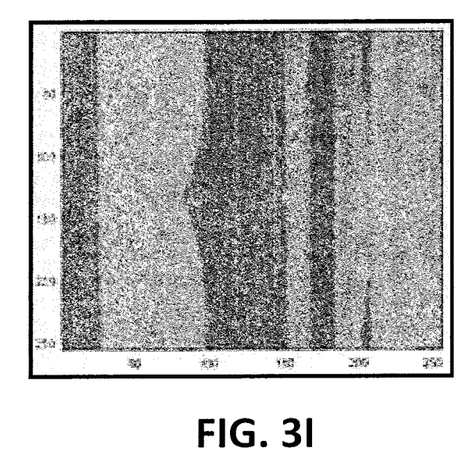

Referring back to FIG. 3A, at block 308, the surface of interest of the workpiece is scanned with the scanning probe (e.g., the AFM) at a second resolution that is higher than the first resolution to derive a second topographical image. As indicated above, the surface of interest is a sub-portion of the first surface. The relatively high resolution (e.g., about 205 pixels per μm) scan is carried out to obtain a high degree of topographical detail of the surface of interest. However, the high resolution scan may include artifacts, curvature, etc., due to limitations of the scanning probe discussed earlier. FIG. 3H illustrates the topographical image of the surface of interest that is represented by $f_{00}(x,y)$. The image of the surface of interest may be, for example, a 10 μm×10 μm image of a portion of the first surface.

Referring back to FIG. 3A, at block 310, the topographical image of FIG. 3H is scaled down to have a same pixel resolution as the topographical image of the first surface. The scaled-down topographical image of the surface of interest shown in FIG. 3I and is denoted by $f_{00}(x',y')$.

Referring back to FIG. 3A, at block 312, a normalized two-dimensional cross-correlation is utilized to carry out pattern recognition to match the scaled-down topographical image of the surface of interest with a corresponding portion in the true topographical image of the first surface as follows:

$$f_{LargeTopo}(x,y), W_1<x<W_2, H_1<y<H_2. \qquad \text{Equation 4}$$

where $W_1$ is an x-axis starting point of the scan of the surface of interest, $W_2$ in the x-axis end point of the of the scan of the surface of interest, $H_1$ is a y-axis starting point of the scan of the surface of interest, and $H_2$ is the y-axis end point of the of the scan of the surface of interest. With a transition of x'=x−$W_1$, y'=y−$H_1$, the matched region is:

$$f_{LargeTopo}(x'+W_1,y'+H_1), 0<x'<W_2-W_1, 0<y'<H_2-H_1 \qquad \text{Equation 5}$$

Figure 3J:
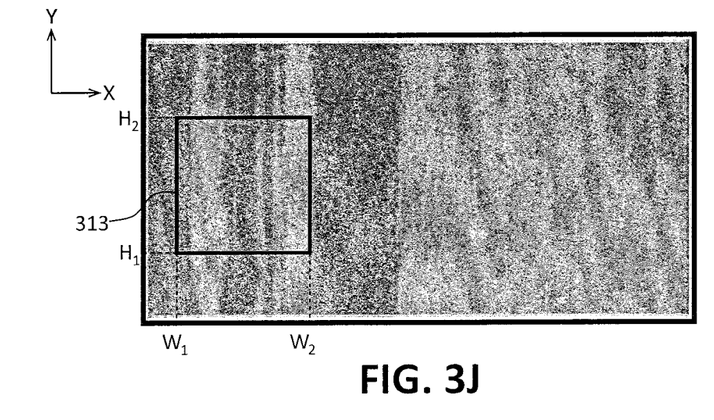

The matched region derived above is illustrated in FIG. 3J and denoted by reference numeral 313.

Referring back to FIG. 3A, at block 314, second-order planes are then found from the matched or recognized portion of the topographical image of the first surface $$f_{LargeTopo}(x'+W_1,y'+H_1): g_{ref1}(x',y')=a_2x^2+b_2y^2+c_2x'y'+d_2x'+e_2y'+f_2 \qquad \text{Equation 6}$$

and the scaled-down topographical image of the surface of interest $f_{00}(x',y')$:

$$g_{interest}(x',y')=a_3x^2+b_3y'^2+c_3x'y'+d_3x'+e_3y'+f_3 \qquad \text{Equation 7}$$

where $a_2$, $b_2$, $c_2$, $d_2$, $e_2$, $f_2$, $a_3$, $b_3$, $c_3$, $d_3$, $e_3$ and $f_3$ are fitting parameters.

Figure 3K:
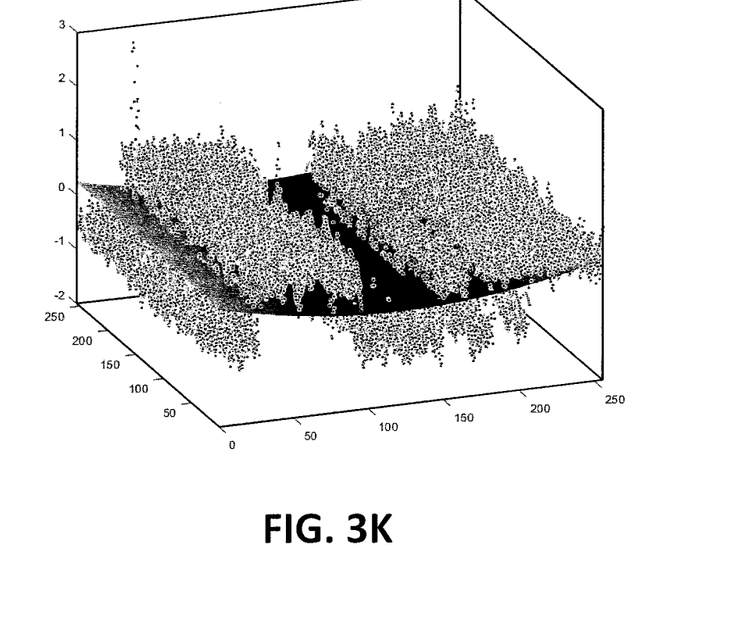
FIGS. 3K, 3L, 3M and 3N are fourth, fifth, sixth and seventh graphs, respectively, of data associated with different stages of the method of FIG. 3A.
Figure 3L:
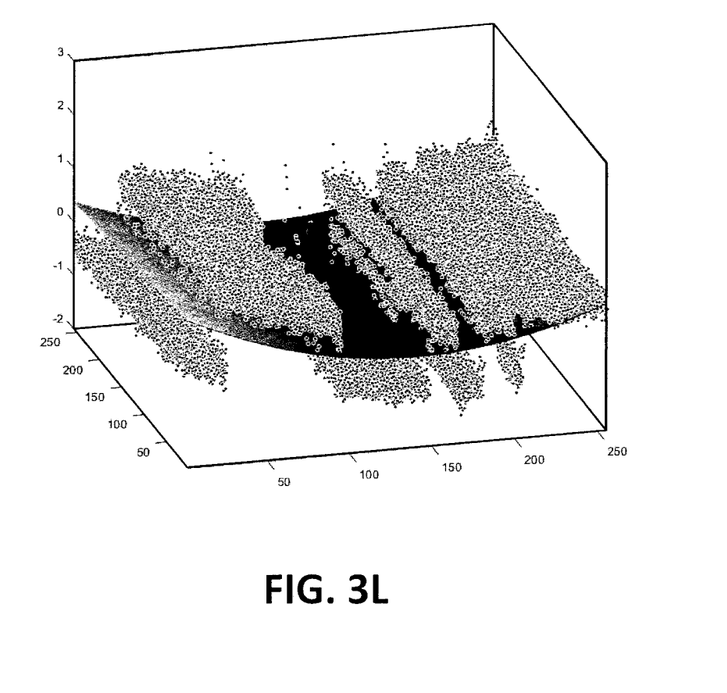
Figure 3M:
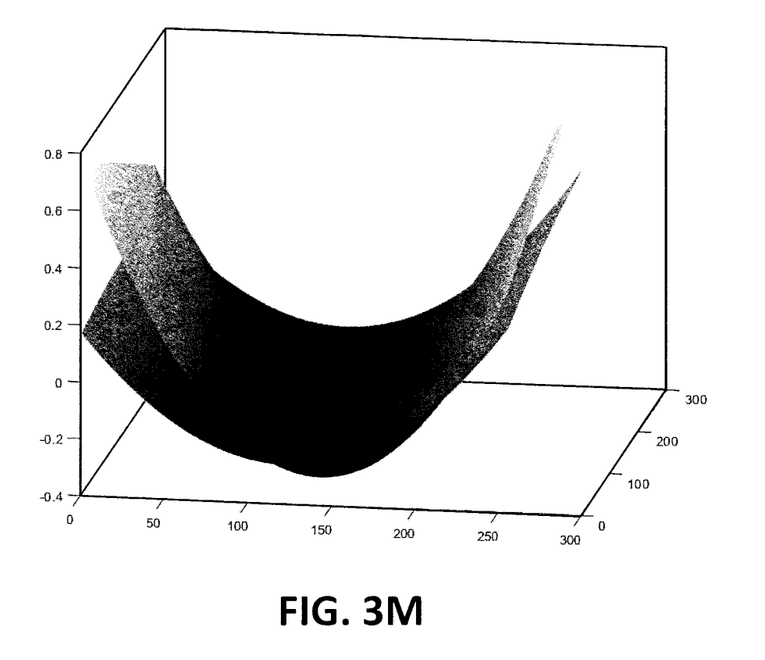
Figure 3N:
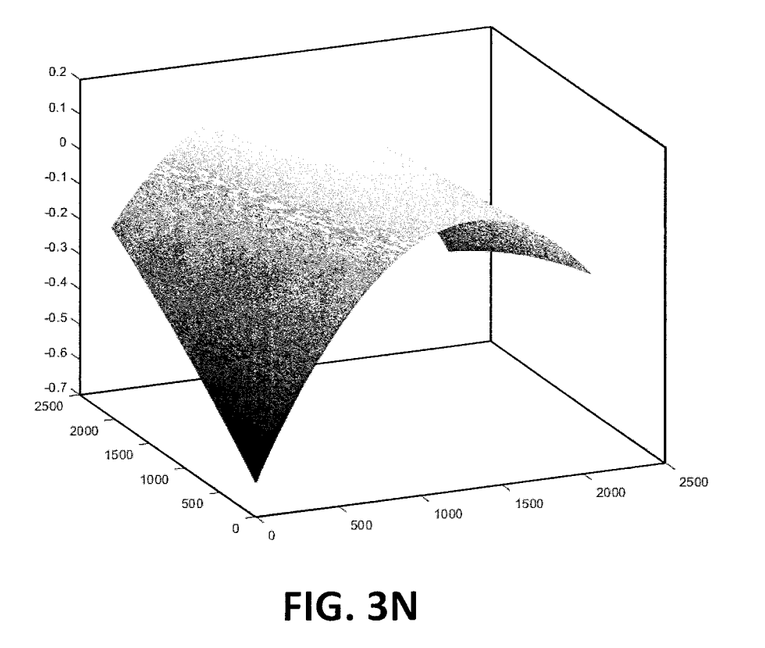
Figure 3O:
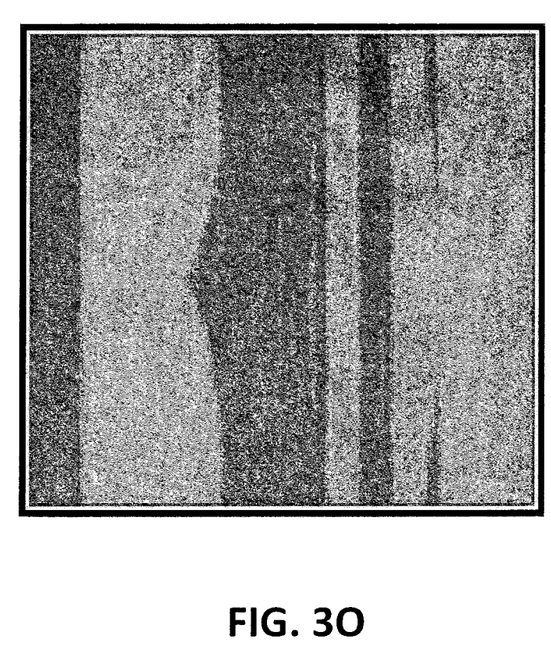
FIG. 3O is a seventh image generated at a stage of the method of FIG. 3A.

FIGS. 3K and 3L illustrate second order planes for the recognized portion of the topographical image of the first surface and the high topographical image of the surface of interest, respectively.

Referring back to FIG. 3A, at block 316, a difference of the two second-order planes is calculated and the result is rescaled to the second relatively high resolution.

$$g_{dif}(x,y)=g_{dif}(x',y')=g_{ref1}(x',y')-g_{interest}(x',y') \qquad \text{Equation 8}$$

At block 318, the rescaled result obtained is added to the original high-resolution topographical image to obtain to a true topographical image of the surface of interest:

$$f_{true\ topo\ interest}(x,y)=f_{00}(x,y)+g_{dif}(x,y) \qquad \text{Equation 9}$$

It should be noted that the scaling/rescaling processes in blocks 310 and 318 may utilize bicubic interpolation and may perform antialiasing. At block 320, the true topography of the surface of interest is saved, for example, in a MATLAB (matrix laboratory) file. The method ends at 322.

Prior techniques for measuring, for example, a topography of write pole 122 relative to contact pad 123 may fail for slider products that include, for example, contact pads 123 that have a very small size and a curvature. Measurement errors may ultimately negatively impact product yield. The above-described embodiments of the disclosure provide a combination of measurements and calculations that address such problems and thereby cause a substantial increase in product yield.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   scanning a first surface of a workpiece with a scanning probe at a first resolution to derive a first topographical image;
   performing a refining operation on the first topographical image to obtain a true first topographical image;
   scanning, with the scanning probe, a surface of interest of the workpiece, which is a sub-portion of the first surface, at a second resolution that is higher than the first resolution to derive a second topographical image;
   scaling down the second topographical image to the first resolution to obtain a scaled-down second topographical image that is separate from the second topographical image at the second resolution;
   after scaling down the second topographical image to the first resolution to obtain the separate scaled-down second topographical image, performing a pattern recognition operation, with the separate scaled-down second topographical image at the first resolution, to substantially match the scaled-down second topographical image to a corresponding sub-portion of the true first topographical image;
   determining a first second-order plane for the matched sub-portion of the true first topographical image;
   determining a second second-order plane for the second topographical image scaled down to the first resolution;
   calculating a difference between the first second-order plane and the second second-order plane;
   rescaling the calculated difference to the second resolution; and
   applying the calculated difference at the second resolution to the second topographical image at the second resolution to obtain a true second topographical image.

2. The method of claim 1 and further comprising:
   scanning, with the scanning probe, a reference surface, which is a part of a substantially flat portion of the workpiece, to derive a reference topographical image; and
   utilizing the reference topographical image to perform the refining operation on the first topographical image to obtain the true first topographical image.

3. The method of claim 2 and wherein utilizing the reference topographical image to perform the refining operation on the first topographical image comprises subtracting the reference topographical image from the first topographical image.

4. The method of claim 1 and wherein the surface of interest comprises a write pole surface and a contact pad surface.

5. The method of claim 1 and wherein scanning the first surface of the workpiece with the scanning probe at the first resolution to derive the first topographical image comprises performing a one-directional scan of the first surface of the workpiece with the scanning probe at the first resolution to derive the first topographical image.

6. The method of claim 5 and further comprising:
   scanning, with the scanning probe, a reference surface, which is a part of a substantially flat portion of the workpiece, to derive a reference topographical image; and
   utilizing the reference topographical image to perform the refining operation on the first topographical image to obtain the true first topographical image.

7. The method of claim 1 and wherein the scaling down of the second topographical image to the first resolution is carried out using bicubic interpolation.

8. The method of claim 1 and wherein the pattern recognition operation is carried out by normalized two dimensional cross-correlation.

9. A method comprising:
   scanning a first surface of a workpiece with a scanning probe at a first resolution to derive a first topographical image;
   performing a refining operation on the first topographical image to obtain a true first topographical image;
   scanning, with the scanning probe, a surface of interest of the workpiece, which is a sub-portion of the first surface, at a second resolution that is higher than the first resolution to derive a second topographical image;
   scaling down the second topographical image to the first resolution;
   performing a pattern recognition operation to substantially match the scaled-down second topographical image to a corresponding sub-portion of the true first topographical image;
   determining a first second-order plane for the matched sub-portion of the true first topographical image;
   determining a second second-order plane for the second topographical image scaled down to the first resolution;
   calculating a difference between the first second-order plane and the second second-order plane;
   rescaling the calculated difference to the second resolution; and
   applying the calculated difference at the second resolution to the second topographical image at the second resolution to obtain a true second topographical image.

10. The method of claim 9 and further comprising:
scanning, with the scanning probe, a reference surface, which is a part of a substantially flat portion of the workpiece, to derive a reference topographical image; and utilizing the reference topographical image to perform the refining operation on the first topographical image to obtain the true first topographical image.

11. The method of claim 10 and wherein utilizing the reference topographical image to perform the refining operation on the first topographical image comprises subtracting the reference topographical image from the first topographical image.

12. The method of claim 9 and wherein the surface of interest comprises a write pole surface and a contact pad surface.

13. The method of claim 9 and wherein scanning the first surface of the workpiece with the scanning probe at the first resolution to derive the first topographical image comprises performing a one-directional scan of the first surface of the workpiece with the scanning probe at the first resolution to derive the first topographical image.

14. The method of claim 13 and further comprising:
scanning, with the scanning probe, a reference surface, which is a part of a substantially flat portion of the workpiece, to derive a reference topographical image; and utilizing the reference topographical image to perform the refining operation on the first topographical image to obtain the true first topographical image.

15. The method of claim 9 and wherein the scaling down of the second topographical image to the first resolution is carried out using bicubic interpolation.

16. The method of claim 9 and wherein the pattern recognition operation is carried out by normalized two dimensional cross-correlation.

* * * * *